Oct. 10, 1933.  H. S. BARBARA  1,930,189
BUMPER GUARD
Filed July 26, 1932  2 Sheets-Sheet 1
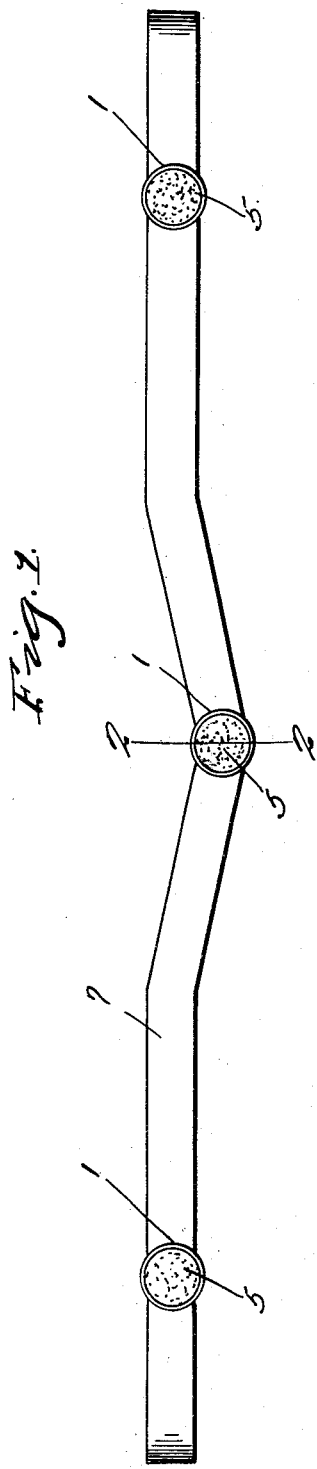
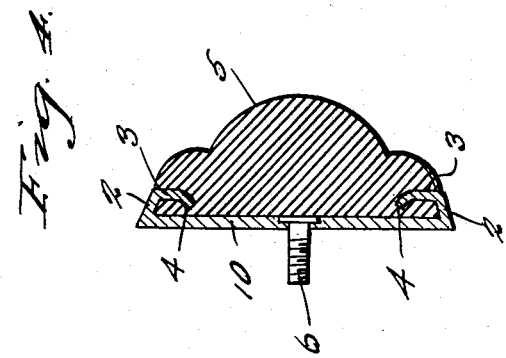
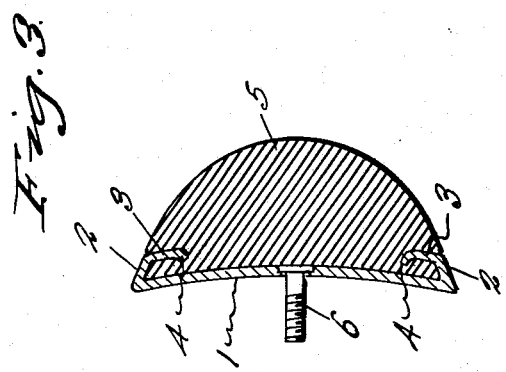
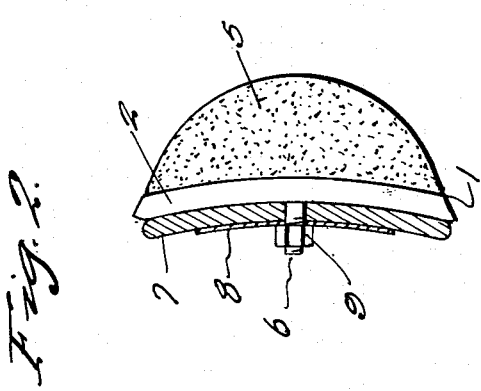
Inventor
Herman S. Barbara
By Clarence A. O'Brien
Attorney Oct. 10, 1933.  H. S. BARBARA  1,930,189
BUMPER GUARD
Filed July 26, 1932   2 Sheets-Sheet 2
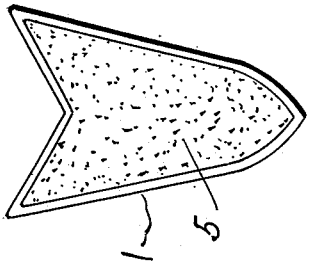
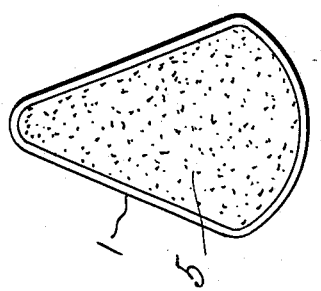
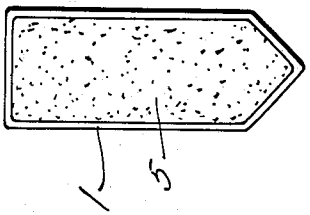
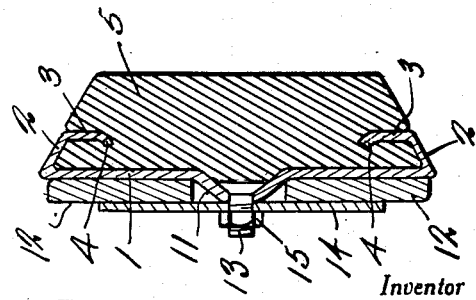
Inventor
Herman S. Barbara
By Clarence A. O'Brien
Attorney Patented Oct. 10, 1933

1,930,189

UNITED STATES PATENT OFFICE 1,930,189

BUMPER GUARD

Herman S. Barbara, Deal, N. J.

Application July 26, 1932. Serial No. 624,843

1 Claim. (Cl. 293—55)

The present invention relates to new and useful improvements in automobile bumper guards and has for its primary object to provide, in a manner as hereinafter set forth, a device of this character embodying a novel construction, combination and arrangement of parts through the medium of which scratching or marring of the bumper which is equipped with said guards or of the bumper of another vehicle which is contacted will be prevented.

Another important object of the invention is to provide a bumper guard of the aforementioned character which will absorb a portion of the shock resulting from a collision.

Other objects of the invention are to provide a bumper guard of the character described which will be simple in construction, strong, durable, compact, highly efficient and reliable in use, attractive in appearance, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in front elevation of an automobile bumper with a plurality of guards constructed in accordance with the present invention mounted in position thereon.

Figure 2 is a view in vertical section, taken substantially on the line 2—2 of Figure 1.

Figure 3 is a view in vertical section through an embodiment of the guard showing the same detached from the bumper.

Figure 4 is a view in vertical section through a slightly modified form of the guard.

Figures 5, 6, and 7 are front elevational views, showing various shapes in which the guard may be made.

Figure 8 is a view in vertical section, showing a guard which is constructed for mounting on dual bar bumpers.

Figure 9 is a view in vertical section through a form of the guard which is intended particularly for use on truck, bus, or other large bumpers.

Figure 10 is a view in vertical section through another modified form of the bumper.

Referring now to the drawings in detail, it will be seen that the reference numeral 1 designates a metallic base having formed integrally with its marginal portions substantially conical or tapered side walls 2 from which extend inwardly directed, integral flanges 3 which, in turn, terminate in lips 4 which are directed substantially toward the base 1.

Molded on the base 1 is a rubber block or cushion 5 of suitable shape. It will be noted that the flanges 3 and the lips 4 are embedded in the rubber cushion 5, thus securely anchoring said rubber cushion to the base 1. The base 1 and the rubber cushion 5 may be of any suitable shape, as illustrated in Figures 5, 6, and 7 of the drawings.

The metallic base 1 is centrally apertured to accommodate a bolt 6, the head of which is countersunk in the base 1. If desired, the bolt 6 may be welded or soldered to the base 1. The reference numeral 7 designates a conventional bumper of the spring bar type having openings drilled therein to accommodate the bolt 6 wherever it is desired to mount one of the guards on said bumper. A metallic plate 8, having an opening therein, is mounted on the inner side of the bumper 7, the bolt 6 passing through said plate and having threaded thereon a retaining nut 9. The nut 9 bears against the plate 8.

The guards illustrated in Figures 1, 2, and 3 of the drawings are for use on bumpers having a bar provided with an outwardly curved outer face and to this end, the base 1 is outwardly curved or bowed to conform to the bumper bar. In Figure 4 of the drawings, the guard is provided with a flat base 10 for mounting on a flat bumper bar. Aside from the fact that the rubber cushion shown in Figure 4 is of a slightly different shape, the form of the invention shown in said Figure 4 is otherwise substantially similar to that illustrated in Figures 1 to 3, inclusive.

In Figure 8 of the drawings, there is shown a form of the guard which is for mounting on bumpers of the dual bar type and to this end, the base 1 is provided with a substantially conical, outwardly pressed, apertured central portion 11 which projects between the vertically spaced bumper bars 12. The conical portion 11 of the base has mounted therein and projecting therefrom a bolt 13 which passes through an opening provided therefor in a plate 14 which bridges the bumper bars 12. The reference numeral 15 designates a retaining nut which is threaded on the bolt 13 and which bears against the plate 14. Thus, the base 1 is clamped in position on the bumper.

In Figure 9 of the drawings there is illustrated a guard which is intended particularly for use on truck, bus or other large vehicle bumpers. In this form of the invention, a pair of vertically spaced bolts 16 pass through the rubber cushion 5 and the base 1 for engagement in openings provided therefor in the bumper. The heads of the bolts 16 are countersunk in the cushion 5, as at 17. If desired, the bolts 16 may be welded or otherwise fixed to the base 1.

In Figure 10 of the drawings there is shown a guard which is particularly designed for mounting on corrugated bumper bars. Toward this end, the base 1 is waved or corrugated to conform substantially to the shape of the bumper bar. Otherwise, the form of the invention illustrated in Figure 10 is substantially the same as those forms shown in Figures 1 to 4 inclusive.

It is believed that the many advantages of a bumper guard constructed in accordance with the present invention will be readily understood, and although the preferred embodiments of the invention are as illustrated and described, it is to be understood that further changes in the details of construction and in the combination and arrangement of parts may be resorted to which will fall within the scope of the invention as claimed.

What is claimed is:

A bumper guard comprising, in combination, a base including a substantially conical projecting central portion having an opening in its apex, a headed bolt mounted in said central portion and projecting through the opening, a cushion moulded on the base and extending into the central portion and engaged with the head of the bolt, said cushion constituting means for retaining the bolt in position in the central portion of the base, an inclined wall integral with the marginal portions of the base and encircling the cushion, an inwardly extending flange integral with the wall and embedded in the cushion, and a lip integral with the flange and extending substantially toward the base from said flange, said lip being also embedded in the cushion.

HERMAN S. BARBARA.